No. 789,324. Patented May 9, 1905.

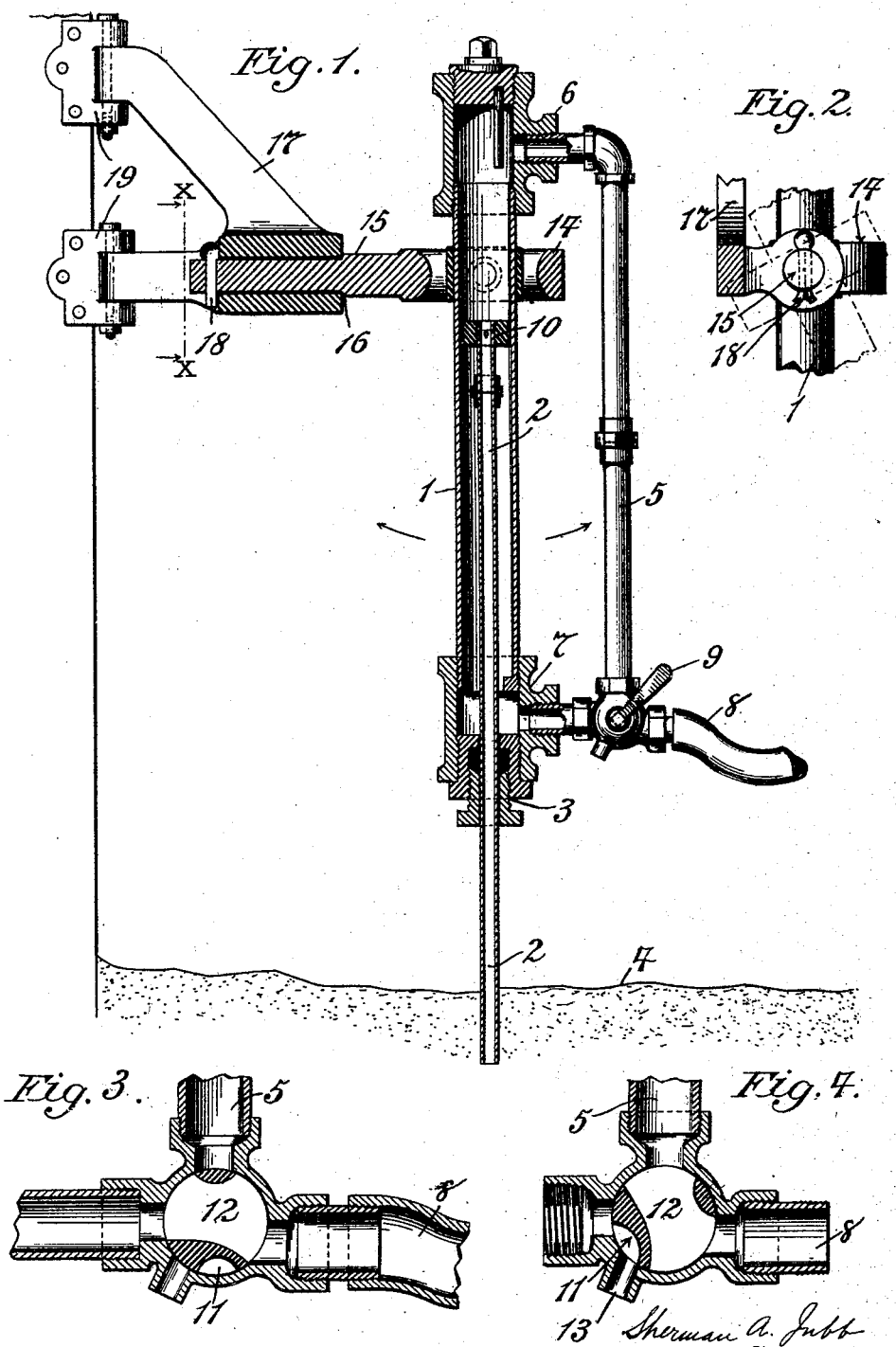

UNITED STATES PATENT OFFICE.

SHERMAN A. JUBB, OF HIGHLANDS, NEW JERSEY.

AUTOMATIC JET-PIPE FOR EXCAVATION.

SPECIFICATION forming part of Letters Patent No. 789,324, dated May 9, 1905.

Application filed December 1, 1904. Serial No. 235,000.

*To all whom it may concern:*

Be it known that I, SHERMAN A. JUBB, a citizen of the United States, residing in Highlands, county of Monmouth, State of New Jersey, have invented a certain new and useful Improvement in Automatic Jet-Pipes for Excavation, of which the following is a specification.

This invention has relation to automatic means for preparing and loosening sand, mud, gravel, or earth in those locations where piles, pipes, or planks are to be sunk or in any locality where loosening of ground is desirable. It has been heretofore customary to use a long heavy pipe raised perpendicularly, with a hose leading to it for this purpose, through which water is forced, so that the ground is washed away at the lower opening of the pipe, while at the same time the pipe itself is forced down into the ground, being lifted from time to time to aid in loosening the earth. This process as heretofore carried out required the services of several men, the pipe being lifted by a slow-acting block and fall in large sizes, making a very difficult and awkward instrument to handle, and it takes a great deal of time.

It is one object of my present invention to provide rapidly-acting and yet simple means easily constructed and not liable to get out of order, whereby the driving of the pipe, as above described, can be rapidly accomplished by one man working alone.

My improvement is illustrated in the accompanying drawings, wherein—

Figure 1 is a side view, partly in section, of one form which my device may be given. Fig. 2 is a view in detail of a part of the suspension means shown in Fig. 1, and Figs. 3 and 4 are sectional views of one form of valve which may be employed for controlling my mechanism.

In the preferred form of my device, which is shown in the drawings, I employ an external cylinder 1, within which the internal jet-pipe 2 is caused to move by the pressure of water, air, or other suitable fluid medium. The jet-tube projects from the cylinder 1 through any appropriate packing or stuffing box 3, and its working extremity is employed, as shown, to force its way into the ground, the level of which is shown at 4. At the side of the main cylinder 1 I provide an auxiliary pipe 5, the ends of which communicate, respectively, with the two ends of the cylinder 1 through the fittings 6 and 7 or otherwise. By means of this auxiliary pipe water or air may be introduced under pressure into either end of the main cylinder at will. In the form shown the fluid enters by the hose-pipe 8, and its course is controlled by the valve 9 in a manner hereinafter described. At the inner extremity of the jet-pipe 2 I provide a piston 10, fitting the cylinder 1, but preferably pierced, as shown, to admit fluid from above into the jet-pipe. This or any other means for introducing fluid with the jet-pipe is within my invention.

The valve 9 may be made in various ways to accomplish the end of turning the water or other fluid into one or the other end of the cylinder 1, and in Figs. 3 and 4 I have shown one form of valve appropriate to this purpose. It is to be understood, however, that I am not limited to the use of the form of valve shown, nor is my invention limited to the use of only one or of any given number of valves in this connection.

The valve, as shown in Figs. 3 and 4, is a simple rotary valve cored out, as shown, with two passages 11 and 12. When turned in the position shown in Fig. 3, the fluid under pressure is allowed to pass from the hose-pipe 8 to the under side of the piston 10 within the cylinder 1. In this position the passage 11 is closed.

On turning the valve into the position shown at Fig. 4 the fluid passes through the passage 12 from the hose-pipe 8 into the auxiliary pipe 5, thus admitting water over the piston 10. At the same time the passage 11 provides an outlet from the under side of the piston 10 to the blow-off pipe 13, and the jet-pipe 2 and piston 10 are thus permitted to descend.

If desired, fluid may be partly turned into both the main pipe 1 and the side pipe 5, thus equalizing the pressure in both and causing the piston 10 and jet-pipe 2 to remain stationary in any position desired. This can be accomplished by rotating the valve slightly to the left or in the direction of negative rotation from the position shown in Fig. 3.

When the jet-pipe is to be supported temporarily in any given position for shifting the entire apparatus or otherwise, the valves can be turned into a position intermediate between those shown in Figs. 3 and 4, closing the outlet from beneath the piston and preventing downward movement thereof.

The whole apparatus thus far described may be suspended in any well-known manner either on permanent posts or on piers, docks, pile-drivers, barges, and the like, according to the work to be done. I prefer to arrange the suspending means so that the whole apparatus can be given any desired direction and can be easily moved by one man into various positions.

In the drawings I have shown one form of suspending device, whereby this may be accomplished in Figs. 1 and 2. Here the entire mechanism is supported pivotally within an appropriate ring 14, which is itself carried by a shank 15, which passes through a supporting-sleeve 16 in the bracket 17. The shank is held in place either by the pin 18 or by any equivalent means. The bracket 17 is preferably supported on hinges 19, fastened to whatever support is intended for carrrying the apparatus.

It will be seen that the device as a whole can be swung out of the way when not in use on the hinges 19 and that when in use it may be turned in any direction, since it is hung upon a universal joint. I am not limited to this means of suspending my improved device, but have shown this means simply as one illustration of many forms which might be used.

My improved device is operated as follows: On being brought into position the jet-pipe 2 is allowed to fall into contact with the ground, and the water or other active fluid is admitted by turning the valve into the position shown in Fig. 4. A portion of the fluid passes through the jet-pipe 2 and acts to wash or blow away the sand, earth, or gravel at the mouth of the jet-pipe, while the pressure of the fluid on the top of the piston 10 serves to force the jet-pipe into the opening as fast as the earth is removed. From time to time it is necessary to lift the jet-pipe either to start a new hole or to give freer vent to the fluid escaping at the bottom of said pipe. For this purpose the operator has only to turn the valve 9 into the position shown in Fig. 3, when the fluid will be admitted below the piston and the jet-pipe will be raised, the fluid above the piston escaping through the jet-pipe. On again advancing the jet-pipe the valve is turned back to the position shown in Fig. 4, when the fluid under the piston will be allowed to escape through the blow-off pipe 13.

By use of this device all the operations hitherto accomplished by the use of a simple jet-pipe can be carried out by the unaided efforts of a single operator, and his work will be not only cheaper but more rapid than in the case of the use of the old form of simple jet-pipe.

What I claim is—

1. In a device of the class described, a main cylinder, a jet-pipe protruding therefrom, a piston on the inner end of said jet-pipe and means for leading fluid into said cylinder over said piston, substantially as described.

2. In a device of the class described, a main cylinder, a stuffing-box in one end thereof, a jet-pipe passing into said cylinder through said stuffing-box, a piston on the inner end of said jet-pipe, means for leading fluid into said cylinder over said piston and means for leading fluid into said cylinder under said piston, substantially as described.

3. In a device of the class described, a main cylinder, a jet-pipe protruding therefrom, a piston on the inner end of said jet-pipe pierced to admit fluid thereto and means for leading fluid into said cylinder over said piston and through it into said jet-pipe, substantially as described.

4. In a device of the class described, a main cylinder, means for suspending the same allowing universal motion thereof, a jet-pipe protruding therefrom, a piston on the inner end of said jet-pipe and means for leading fluid into said cylinder over said piston, substantially as described.

5. In a device of the class described, a main cylinder, a stuffing-box in one end thereof, a jet-pipe passing into said cylinder through said stuffing-box, a piston on the inner end of said jet-pipe and pierced to admit fluid thereto, means for leading fluid into said cylinder above said piston and through it into the jet-pipe and means for leading fluid into the cylinder below said piston, substantially as described.

6. In a device of the class described, a main cylinder, a jet-pipe protruding therefrom, a piston on said jet-pipe and means for controlling the admission of fluid into said cylinder either above or below said piston, substantially as described.

7. In a device of the class described, a main cylinder, a jet-pipe protruding therefrom, a piston on said jet-pipe, a side pipe opening into said cylinder at its opposite ends and means for controlling admission of fluid into said main cylinder or said side pipe at will, substantially as described.

8. In a device of the class described, a main cylinder, a jet-pipe protruding therefrom, a piston on said jet-pipe, a side pipe having two elbows for connecting said side pipe with said cylinder at its ends and a valve on one of said elbows for admitting fluid either directly to the cylinder or through the side pipe at will, substantially as described.

SHERMAN A. JUBB.

Witnesses:
H. S. MACKAYE,
FLORENCE PICK.